April 9, 1946.  G. M. EHLERS ET AL  2,398,088

ELECTRIC CAPACITOR AND DIELECTRIC FOR SAME

Filed Aug. 25, 1938

INVENTORS.
George M. Ehlers.
Roland R. Roup.
BY John W. Michael
ATTORNEY.

Patented Apr. 9, 1946

2,398,088

UNITED STATES PATENT OFFICE 2,398,088

ELECTRIC CAPACITOR AND DIELECTRIC FOR SAME

George M. Ehlers and Rolland R. Roup, Milwaukee, Wis., assignors to Globe-Union Inc., Milwaukee, Wis., a corporation of Delaware Application August 25, 1938, Serial No. 226,734

9 Claims. (Cl. 106—39)

This invention relates to solid condenser dielectric material and to an improvement in electric condensers particularly adapted for embodiment in the small type of electric condenser employed in radio circuits.

Prior to the discovery that titanium dioxide might be treated in certain special ways to provide a solid dielectric material having a high dielectric constant, the solid dielectric materials known and available and ordinarily used had a dielectric constant of the maximum order of approximately six and such dielectric material had what is referred to as a large positive temperature coefficient of dielectric constant, such that the capacity of the condenser in which they were employed increased with an increase in temperature. Such changes of capacity with changing temperatures of a dielectric of a condenser employed in radio receivers is of considerable disadvantage since it results in a detuning of the receiver. Furthermore, while the comparatively recently discovered specially treated titanium dioxide possessed a high dielectric constant which is desirable, and also a low dielectric power factor, which is also desirable, it has a large negative temperature coefficient of dielectric constant which is disadvantageous in many practical applications. Sometimes it is desirable for the dielectric of a capacitor in a radio receiver to have a small negative temperature coefficient of dielectric constant in order to compensate for the changes in the value of inductance in the same circuit due to temperature changes and always of a positive nature. If, however, the negative temperature coefficient of the dielectric constant is too high then of course, it overbalances the changes in the values of the inductance and does not truly compensate for them.

One of the objects of the present invention is to provide for the precise and accurate control of the temperature coefficient of the dielectric constant and to accomplish this while retaining the dielectric constant at the desired value. In many instances it is desirable to maintain the dielectric constant at a high value and the present invention provides for this and yet makes it practical to establish the temperature coefficient of the dielectric constant either at a positive or negative value or a zero value.

We have discovered that compounds of the rare earths and certain other compounds of related elements in the periodic table possess properties which admirably adapt them to function as a solid dielectric material either individually or blended. We have further discovered that these compounds have the property of combining with a titanium dioxide dielectric to provide a solid dielectric material having a high dielectric constant, a low dielectric power factor and any desired temperature coefficient of dielectric constant ranging from the negative value of the titanium dioxide dielectric through a zero temperature coefficient to approximately the relatively high positive temperature coefficient of the rare earth compounds or earths employed in the mix. The elements whose compounds possess the desired properties and are capable of functioning as contemplated by the present invention have atomic numbers ranging between 57 and 72, both inclusive, in the periodic table. We have actually employed compounds of neodymium, lanthanum, cerium, samarium, and praseodymium but it is believed that compounds of the elements listed below which were used in small percentages in combination with the above mentioned materials may also be used with similar advantage

| Lanthanum | Europium | Erbium |
|---|---|---|
| Cerium | Gadolinium | Thulium |
| Neodymium | Terbium | Ytterbium |
| Praseodymium | Dysprosium | Lutecium |
| Samarium | Holmium | Hafnium |
| Illinium | | |

Compounds of these elements, such as their oxides, above listed, have a positive temperature coefficient of their dielectric constant and when mixed in proper portions with titanium dioxide, the resultant mixes have a temperature coefficient which is zero, negative or positive, depending upon the relative proportions of the titanium dioxide dielectric and the ingredients mixed therewith having a positive temperature coefficient of dielectric constant. The mixtures of the selected materials are fired to the vitrifying temperature of the mixture and usually it is desirable to include a suitable fluxing material in the mix to reduce porosity and facilitate vitrification. The requirements of an appropriate flux are that while it must aid in reducing porosity it must not substantially increase the power losses. Many compounds are suitable for fluxes. Typical of these are various calcium, magnesium, beryllium and aluminum silicates as well as silica and calcium and magnesium titanates.

An organic plasticizer such as starch or flour, may be mixed with these materials to render them sufficiently plastic to extrude into the form of a tube which is cut to the proper length for the desired capacity, fired, and metal coated on its inner and outer sides to provide the plates of the condenser on the opposite sides of the dielectric constituted by the tubes. Suitable binder can be added to render the mixtures suitable for pressing or molding into disks or any other desired shapes, etc. The firing operation is oxidizing and removes any combustible binder.

Figure 1:
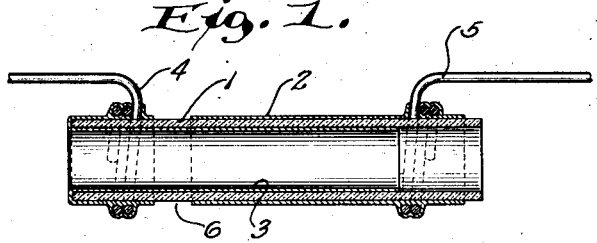
Figure 1 is a view in central longitudinal cross section showing a cylinder type plate condenser embodying the present invention.
Figure 2:
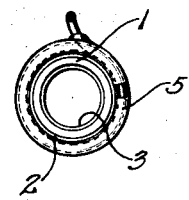
Figure 2 is a view thereof in end elevation.

Referring to the drawing and more particularly to Figures 1 and 2, the numeral 1 designates a ceramic tube which is suitably extruded and then fired, the tube being constituted of the dielectric material herein described to give it a high dielectric constant and the desired temperature coefficient. The outer plate of the condenser is designated at 2 and the inner plate thereof at 3, both of these plates being formed by silvering the ceramic tube or applying some other electrical conductor thereon by means of any of the well known mechanical or chemical methods. For example, the Rochelle Salts method may be employed. After the silvering, the silver films may then be copper plated.

The plate 2 does not extend to the ends of the tube but terminates short of both ends and well short of the left hand end, as viewed in Figure 1. Likewise, the plate 3 terminates short of one end of the tube but does extend around the other end terminating however in spaced relation to the adjacent edge of the plate 2. By having plates 2 and 3 terminate short one end of the tube and then spaced from each other at the other end portion, flashing over is prevented and yet it is feasible to solder lead wires 4 and 5 to the plates on the outside of the tube. The adjacent ends of the plates 2 and 3 on the outside of the tube are separated by an effective air gap 6.

This type of capacitor or condenser is very easy to make and may be manufactured practically and economically and has values ranging from 5 mmf. to 2000 mmf. depending upon the diameter, length, and wall thickness of the ceramic tube employed and the area of the conducting surface. Adjustment of the capacity of the capacitor or condenser can be readily accomplished by grinding off a variable amount of metal coating.

Figures 3, 4:
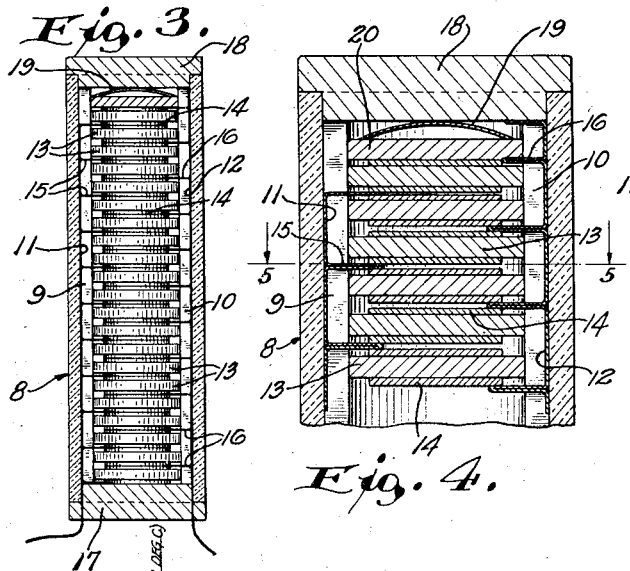
Figure 3 is a view in central vertical longitudinal section showing another form of a condenser, one employing a multiplicity of parallel plates with interposed new dielectric material suitable for larger capacity, parts being shown in elevation for the sake of illustration.
Figure 4 is a fragmentary view similar to Figure 3 but on a larger scale and showing the various parts in cross section.
Figure 5:
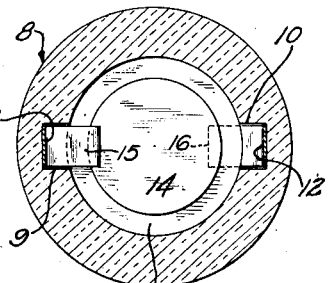
Figure 5 is a view in horizontal cross section taken on line 5—5 of Figure 4.

The form of the invention shown in Figures 3, 4 and 5 is a parallel type capacitor somewhat more difficult to manufacture but better adapted for obtaining larger capacities.

In this form of the invention the capacitor comprises a housing 8 of insulating material and provided with two diametrically opposite, longitudinally extending grooves 9 and 10 on its inner wall. Very thin metal connector strips or bus bars 11 and 12 are accommodated in the grooves 9 and 10 respectively and serve to connect electrically the individual sections of the capacitor in parallel. These individual sections are made up of wafers 13 of the new dielectric material having both sides metal coated as at 14 either by the method described above or by use of the Schoop metal spray process. Each of these wafers forms a small capacitor with a metal coating for plates and a ceramic dielectric. The metal connector strips or bus bars 11 and 12, which may be of tin foil or similar material, are doubled or folded at regularly spaced intervals as indicated at 15 and 16 and these folded portions extend inwardly and are interposed between and in contact with the metal coatings 14 of adjacent wafers 13.

The projections 15 of the bus bar 11 are in contact with the metal coatings 14 of alternate juxtaposed surfaces of the wafers 13, while the projections 16 on the bus bar 12 are in similar contact with the metal coated surfaces 14 of the alternate juxtaposed wafers intermediate to those contacted by the projections 15. The bus bar 11 is in electrical contact with a metal cap 17 cemented in the lower end of the housing 8, while the bus bar 12 is in electrical connection with a metal cap 18 cemented in the upper end of the housing 8. In this way all of the individual capacitors formed by the small metal coated wafers 13 are electrically connected in parallel between the metal caps 17 and 18. A small bowed metal spring 19 has its bowed portion engaged with and pressed downwardly on the cap and it in turn presses down on a small metal washer 20 engaged with the metal surface 14 of the uppermost wafer 13 to keep the entire pile or stack of wafers under compression and maintain good electrical contact between their metal coatings 14 and their inward projections 15 and 16 of the bus bars.

In either construction, the dielectric material is constituted as herein described. The elements listed above may be combined in various proportions depending upon the particular characteristics desired. For the sake of example a number of mixes will now be described.

Composition of zero temperature coefficient mix.

|  | Percent |
|---|---|
| Neodymium oxide | 48.2 |
| Samarium oxide | 5.3 |
| Titanium dioxide | 43.0 |
| China clay | 3.5 |

Composition for −.0004 micro-micro farads per micro-micro farads per degree centigrade.

|  | Percent |
|---|---|
| Neodymium oxide | 13.0 |
| Lanthanum oxide | 13.0 |
| Samarium oxide | 1.5 |
| Praseodymium oxide | 3.5 |
| Titanium dioxide | 65.5 |
| China clay | 3.5 |

Figure 6:
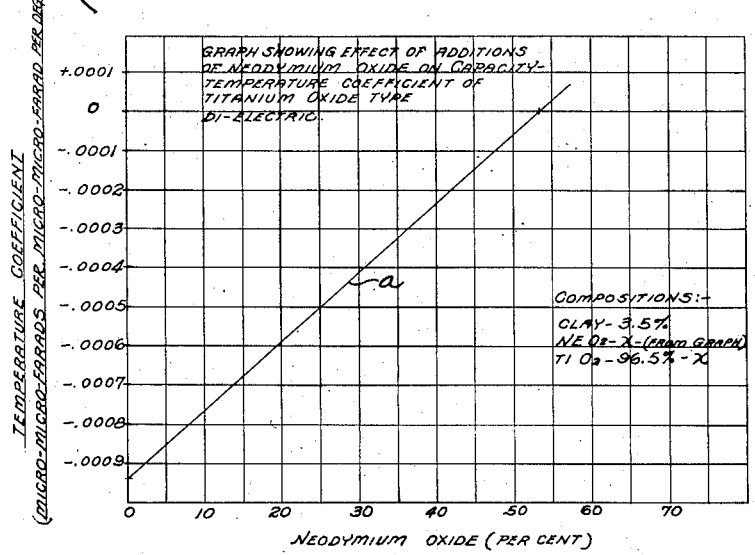
Figure 6 is a graph showing the effect of the addition of one of the rare earths such as neodymium oxide on the capacity temperature coefficient of titanium oxide type dielectric.

Figure 6 illustrates graphically the effect of additions of neodymium oxide on the temperature coefficient of the titanium oxide type of dielectric. The line $a$ illustrates how the temperature coefficient of dielectric constant of titanium oxide may be brought up from a negative value through zero to a positive value as the percentage of neodymium oxide in the mix is increased.

Some of the advantages of the present invention may be realized by utilizing zirconium oxide as the medium whereby the temperature coefficient of the dielectric of titanium oxide is modified. Zirconium oxide has a low negative temperature coefficient of dielectric constant and obviously by utilizing it in suitable proportions in a mix including titanium oxide the temperature coefficient of the resulting mix may be varied between the high negative temperature coefficient of the titanium oxide and the low negative temperature coefficient of the zirconium oxide. Then again, use may be made of the compounds or oxides of thorium which has a zero temperature coefficient and hence may be combined with the titanium oxides to establish the value of the temperature coefficient of the resulting mix at some point intermediate the high negative coefficient of the titanium oxide and the zero temperature coefficient of the thorium oxide.

While we have shown and described several constructions in which the invention may be embodied, and pointed out several particular compositions of the new dielectric, it is to be understood that these are to be taken as illustrative or exemplary rather than restrictive and that various changes in the size, shape and arrangement of the parts of the condenser and in the proportions and combinations of the elements employed in the composition may be made as will be understood by those skilled in the art without departing from the spirit of the invention or the scope of the subjoined claims.

The invention claimed is:

1. A condenser dielectric having a high dielectric constant and a predetermined temperature coefficient of dielectric constant and comprising a vitrified crystalline mass of titanium dioxide of high dielectric constant and of high negative temperature coefficient of dielectric constant, a compound of a rare earth of high dielectric constant, low dielectric power factor and positive temperature coefficient of dielectric constant, and a flux which aids in reducing porosity without materially increasing power losses or materially impairing the high dielectric constant, the titanium dioxide and the rare earth compound being present in such proportions in the mass as to fix the temperature coefficient of dielectric constant of the mass at a predetermined value within a range including zero, positive values slightly above zero, and negative compensating values below zero.

2. A condenser dielectric comprising a vitrified, crystalline mass of a compound of an element having an atomic number ranging between fifty-seven and seventy-two, both inclusive, and having a high dielectric constant, a low dielectric power factor and a positive temperature coefficient of dielectric constant, and a flux which aids in reducing porosity without materially increasing the power losses or materially impairing the high dielectric constant.

3. A condenser dielectric comprising a vitrified, crystalline mass, of a rare earth having a high dielectric constant, a low dielectric power factor, and a positive temperature coefficient of dielectric constant, and a flux which aids in reducing porosity without materially increasing power losses or materially impairing the high dielectric constant.

4. In a condenser dielectric comprising a vitrified crystalline mass, the element neodymium providing a material having a high dielectric constant, a low dielectric power factor and a positive temperature coefficient of dielectric constant, and a flux which aids in reducing porosity without materially increasing power losses or materially impairing the high dielectric constant.

5. In a condenser dielectric comprising a vitrified crystalline mass, the element lanthanum providing a material having a high dielectric constant, a low dielectric power factor and a positive temperature coefficient of dielectric constant, and a flux which aids in reducing porosity without materially increasing power losses or materially impairing the high dielectric constant.

6. In a condenser dielectric comprising a vitrified crystalline mass, the element praseodymium providing a material having a high dielectric constant, a low dielectric power factor and a positive temperature coefficient of dielectric constant, and a flux which aids in reducing porosity without materially increasing power losses or materially impairing the high dielectric constant.

7. A condenser dielectric having a high dielectric constant and a predetermined temperature coefficient of dielectric constant and comprising a vitrified crystalline mass of titanium dioxide of high dielectric constant and of high negative temperature coefficient of dielectric constant, a compound of neodymium of high dielectric constant, a low dielectric power factor and a positive temperature coefficient of dielectric constant, and a flux which aids in reducing porosity without materially increasing power losses or materially impairing the high dielectric constant, the titanium dioxide and the neodymium compound being present in such proportions in the mass as to fix the temperature coefficient of dielectric constant of the mass at a predetermined value within a range extending from positive values slightly above zero through zero to negative compensating values below zero.

8. A condenser dielectric having a high dielectric constant and a predetermined temperature coefficient of dielectric constant and comprising a vitrified crystalline mass of titanium dioxide of high dielectric constant and of high negative temperature coefficient of dielectric constant, a compound of lanthanum of high dielectric constant, a low dielectric power factor and a positive temperature coefficient of dielectric constant, and a flux which aids in reducing porosity without materially increasing power losses or materially impairing the high dielectric constant, the titanium dioxide and the lanthanum compound being present in such proportions in the mass as to fix the temperature coefficient of dielectric constant of the mass at a predetermined value within a range extending from positive values slightly above zero through zero to negative compensating values below zero.

9. A condenser dielectric having a high dielectric constant and a predetermined temperature coefficient of dielectric constant and comprising a vitrified crystalline mass of titanium dioxide of high dielectric constant and of high negative temperature coefficient of dielectric constant, a compound of praseodymium of high dielectric constant, a low dielectric power factor and a positive temperature coefficient of dielectric constant, and a flux which aids in reducing porosity without materially increasing power losses or materially impairing the high dielectric constant, the titanium dioxide and the praseodymium compound being present in such proportions in the mass as to fix the temperature coefficient of dielectric constant of the mass at a predetermined value within a range extending from positive values slightly above zero through zero to negative compensating values below zero.

GEORGE M. EHLERS.
ROLLAND R. ROUP.